United States Patent
Budney et al.

(10) Patent No.: US 7,133,683 B1
(45) Date of Patent: Nov. 7, 2006

(54) POSITION LOCATION SMDPP MESSAGE RETRY MECHANISM

(75) Inventors: Jeffrey A. Budney, Morris Plains, NJ (US); Colin Mangler, Easton, PA (US)

(73) Assignee: Cellco Partnership, Bedminster, NJ (US)

( * ) Notice: Subject to any disclaimer, the term of this patent is extended or adjusted under 35 U.S.C. 154(b) by 244 days.

(21) Appl. No.: 10/704,698

(22) Filed: Nov. 12, 2003

(51) Int. Cl.
*H04Q 7/20* (2006.01)

(52) U.S. Cl. .............................. 455/456.1; 455/404.2; 342/357.09

(58) Field of Classification Search ............. 455/456.1, 455/404.2, 414.2, 440, 456.2, 456.5, 457; 342/357.09, 357.12, 357.01, 357.06, 357.08
See application file for complete search history.

(56) References Cited

U.S. PATENT DOCUMENTS

| | | | |
|---|---|---|---|
| 6,553,236 B1 | 4/2003 | Dunko et al. | |
| 6,597,910 B1 * | 7/2003 | Ra | 455/433 |
| 6,625,437 B1 | 9/2003 | Jampolsky et al. | |
| 6,804,494 B1 * | 10/2004 | Fernandez-Corbaton et al. | 455/65 |
| 6,879,838 B1 * | 4/2005 | Rankin et al. | 455/456.6 |
| 6,907,224 B1 * | 6/2005 | Younis | 455/12.1 |
| 6,928,292 B1 * | 8/2005 | Tsunehara et al. | 455/456.1 |
| 2002/0042260 A1 | 4/2002 | Saucedo et al. | |
| 2002/0072376 A1 | 6/2002 | Carlsson et al. | |
| 2002/0094822 A1 | 7/2002 | Anctil et al. | |
| 2003/0109245 A1 | 6/2003 | McCalmont et al. | |
| 2003/0190912 A1 | 10/2003 | Jampolsky et al. | |

\* cited by examiner

*Primary Examiner*—Nick Corsaro
*Assistant Examiner*—Nghi H. Ly
(74) *Attorney, Agent, or Firm*—McDermott Will & Emery LLP

(57) ABSTRACT

Failures in a message exchange, during a procedure for determining the location of a mobile station, are alleviated by providing a retry mechanism. Upon receipt of a particular failure message, such as the SMS Cause Code 33, rather than abort the location operation, the node receiving the failure message retransmits its last previous message. In an Assisted GPS (AGPS) example, essentially, whenever the Position Determining Entity (PDE) 25 receives an SMS Cause Code 33 from the mobile switching center (MSC) 15, it will resend the last previous Invoke message, without delay or alteration. This will give MSC 15 another chance to deliver the message to the mobile station 5 and ideally continue the message flow until the mobile station has been successfully located. The PDE 25 may retry a particular Invoke message one or multiple times. The receipt of other SMSCauseCode values may still cause the message exchange to abort.

19 Claims, 3 Drawing Sheets

POSITION LOCATION SMDPP MESSAGE RETRY MECHANISM

TECHNICAL FIELD

The present subject matter relates to techniques and equipment to improve the efficiency and reliability of network process of obtaining location information, regarding a mobile communication device, such as a cellular telephone station.

BACKGROUND

Many new communications devices and related services have emerged, to allow people to communicate freely as they roam, without the need for a fixed network connection. In particular, modern digital public wireless telephone networks offer customers a wide range of voice and data communication services combined with a high degree of mobility. In this context, situations arise in which it is desirable to obtain information about the physical or geographic location of a mobile communication terminal and/or its user. For example, if a cellular telephone user encounters an emergency situation, the user dials 911 or the like; and the emergency response center needs to know the actual location of the telephone and thus of the caller to direct emergency response personnel to the correct place. As another example, some carriers offer services in which authenticated third parties may request the location of a subscriber's mobile station. Services are also known in which the user at the mobile station itself may request location information and/or information about the surrounding geographic locale for display on or audio presentation from the mobile station.

To support such services, a network architecture has been developed that includes a position determining entity (PDE), which requests and processes position related data to determine the location of a mobile device. For example, if the mobile device is equipped with a global positioning satellite (GPS) receiver, the PDE will request and process GPS data from the mobile station to determine the latitude and longitude of the mobile station. However, certain problems have been found with the signaling procedure used to request and direct the necessary data to the PDE. To appreciate the problems, it may be helpful to consider network architecture and the signaling involved in a GPS based location procedure, in somewhat more detail.

In Assisted GPS, the Position Determining Entity (PDE) determines the actual Latitude and Longitude of the mobile based on GPS measurements taken by the mobile station at the PDE's request. The process of locating a mobile telephone station using Assisted GPS (AGPS) involves several elements. In practice, a Mobile Positioning Center (MPC) or other similar element requests location information for a particular mobile telephone station from the PDE. The mobile switching center (MSC) serving the mobile station delivers messages to/from the mobile station, including those exchanged with the PDE. The request and response messages between the PDE and the mobile station (via the MSC) take the form of ANSI-41 SMDPP data burst messages with IS-801 defined bearerdata.

A problem has arisen due to interference in the network to mobile data burst messaging, which causes the MSC to reject a SMDPP Invoke message from the PDE with a return result marking SMSCause Code 33—"Destination Busy." As one example, this may occur if the PDE's acknowledgement (Ack) of an earlier message from the MSC and an Invoke message from the PDE are received in reverse order by the MSC. Normally, the PDE acknowledges the last message from the MSC, and then it may send a further Invoke message. The MSC expects an acknowledgement (Ack) prior to any such new Invoke messages. When the MSC receives a new Invoke message before the acknowledgement (Ack) of its last preceding message, the MSC replies with SMSCause Code 33 (Destination Busy). Previously the PDE stopped call processing upon receiving the Cause Code. Hence, call flows would be terminated prematurely, and the PDE was unable to locate the mobile device.

FIG. 3 depicts the signal flow involved in an exemplary prior art procedure for determining the location of a mobile device having a GPS receiver. As shown, in step S31, the PDE initiates the AGPS call flow, by sending a first SMDPP Invoke message (#1) to the MSC, via the SS7 network, and the MSC delivers that message to the mobile telephone station via the air interface. The BearerData of the message contains an IS-801 Position Determination Data Message (PDDM) for the mobile station. An example of what the first message might be is a "Request Mobile Station Info" message.

In the next step (S32), the MSC acknowledges receipt of the first Invoke message by sending an SMDPP return result message containing an acknowledgement (Ack). Although not shown as a separate step, the mobile telephone station replies to the PDE's message via the air interface; and in response, the MSC packages the PDDM response data message in an upstream SMDPP Invoke message, for delivery via the Signaling System 7 (SS7) network to the PDE (step S33). An example of what the reply message might be is a "Provide Mobile Station Info" message, for example, to supply requested data on functional capabilities from the mobile station to the PDE for further processing. The process of requesting and obtaining data from the mobile station in this manner requires two or more successive message exchanges, of this type, in order to supply all of the necessary data to the PDE to allow the PDE to resolve the GPS information and compute the latitude and longitude of the mobile station's current location.

After the Invoke message (S33) from the MSC, the PDE must now acknowledge receipt and initiate its next request to the mobile telephone station for more data. Hence, in step S34, the PDE sends an acknowledgement (Ack), in an SMDPP return result message, back to the MSC. The PDE then sends a second SMDPP Invoke message (Invoke #2), for example, a "Request Pilot Phase Measurement" message or a "Request Pseudo Range Measurement" message (S35). To distinguish the Ack and second Invoke messages in the drawing, the SMDPP return result type acknowledgement (Ack) message is shown in dashed-line form, whereas the subsequent SMDPP Invoke #2 message is shown as a solid line. At step S36, due to network latency, divergent paths, or other issues, the PDE's acknowledgement (Ack) message and the second Invoke message actually arrive at the MSC in reverse order (as shown to the left), as compared to the order in which they were sent (as shown to the right). Because of the order of arrival, at step S37, the MSC rejects the PDE's second Invoke message, by generating an SMSCauseCode of 33 (Destination Busy). In response, the PDE aborts the call flow. Consequently, because of the reordering of the packet messages between the PDE and the MSC, the attempt to obtain the location information for the mobile station from the MSC breaks down and fails.

This problem is not easily avoided because the ANSI-41 SS7 messages in use are defined in the standard SCCP Class 0, which means that delivery order can not be guaranteed. As noted above, obtaining all necessary data for determining location takes several rounds of requesting data and receiving data from the mobile station via the MSC. Each time either node receives an Invoke message, it must respond with an acknowledgement. In the course of such an AGPS call flow, it is possible to have one or more failure points based on the message order or other network issues. At present, there is no method or mechanism to compensate for these failures. In view of the need to obtain the location information, a need exists for a technique to allow the system to complete the communication of the location information from the MSC to the PDE, despite the reordering of the messages during the packet communication or other similar reasons for the MSC to generate a failure message that would otherwise abort the location process.

SUMMARY

The concepts disclosed herein alleviate the above noted problems with failures occurring in the message exchange between network elements, in a procedure for determining the location of a mobile station. Upon receipt of a certain type of failure message, such as the SMS Cause Code 33, rather than abort the location operation, the node receiving the failure message retransmits its last previous message.

In the AGPS example, essentially, whenever the PDE receives an SMS Cause Code 33 from the MSC, it will resend the last previous Invoke message without delay or alteration. This will give the MSC another chance to deliver the message to the mobile station and ideally continue the message flow until the mobile station has been successfully located. The PDE may retry a particular Invoke message one or multiple times. The receipt of other SMSCauseCode values may still cause the message exchange to abort.

Hence, a method is disclosed for exchanging messages through a signaling network with a node of a wireless communication system serving a plurality of mobile stations, to obtain information relating to a geographic location of a selected mobile station operating in the wireless communication system. This method entails receiving a message from the node and sending an acknowledgement of the received message intended for the node, through the signaling network. After sending the acknowledgement of the received message, an information request message, intended for the node, also is sent through the signaling network. A message is received from the node indicating one of a number of possible failure conditions, for example a "Destination Busy" that may have been caused by an improper order of receipt of previous messages at the node.

In response to the receipt of the message indicating the predetermined failure condition, the method involves resending the information request message, intended for the node, through the signaling network. A response message from the node may then be received via the signaling network, where the response message now contains requested information relating to the geographic location of a selected mobile station.

Another method disclosed herein determines a geographic location of a selected mobile station operating in a wireless communication network. This method comprises sending a first request signaling message to a mobile switching center of the wireless communication network, to request first information regarding the mobile station location and receiving the first requested information from the mobile switching center. An acknowledgement signaling message is sent to the mobile switching center, acknowledging receipt of the first requested information. Also, a second request signaling message is sent to the mobile switching center, to request additional information regarding the mobile station location.

After sending the second request signaling message, if a signaling message from the mobile switching center indicating a failure is received, then the method involves resending the second request signaling message to the mobile switching center. Essentially, the methodology repeats the request for the additional information regarding the mobile station location. When the additional requested information is received from the mobile switching center, the received information is processed to determine the geographic location of the selected mobile station.

The concepts summarized above also may be embodied in systems or network nodes, for example, programmed to implement one or more of the methodologies. Also, the concepts may be embodied in the form of programming, for example, for execution by a system serving as a PDE or the like, so as to implement one or more of the methodologies.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The various techniques disclosed herein address problems of signaling protocol failures in mobile station location operations. For example, whenever the PDE receives a message indicating at least one particular type of failure from the MSC, it will resend the last previous Invoke message without delay or alteration. This will give the MSC another chance to respond and continue the station location operation. In the AGPS example, this allows the MSC to deliver the latest Invoke message to the mobile station and then provide the GPS data to the PDE. Ideally, the network can continue the message flow until the mobile station has been successfully located. The PDE may retry a particular invoke message one or a finite number of times; and in process flows with several invoke and response type message exchanges, the need for retransmission of an invoke message may arise at several points in the procedure.

It is assumed that those skilled in the art are familiar with modern wireless communications networks, such as public cellular telephone and data networks, in which it may be desirable to locate a particular user and/or mobile terminal device. However, to provide a context for the later processing examples and to facilitate easy understanding, it may be helpful here to summarize the structure and operation of an exemplary network. Although the present concepts are applicable to other network architectures, for this discussion, it is assumed that the wireless communication system is a public cellular telephone network of the type represented by the high-level, functional block diagram of FIG. 1.

Figure 1:
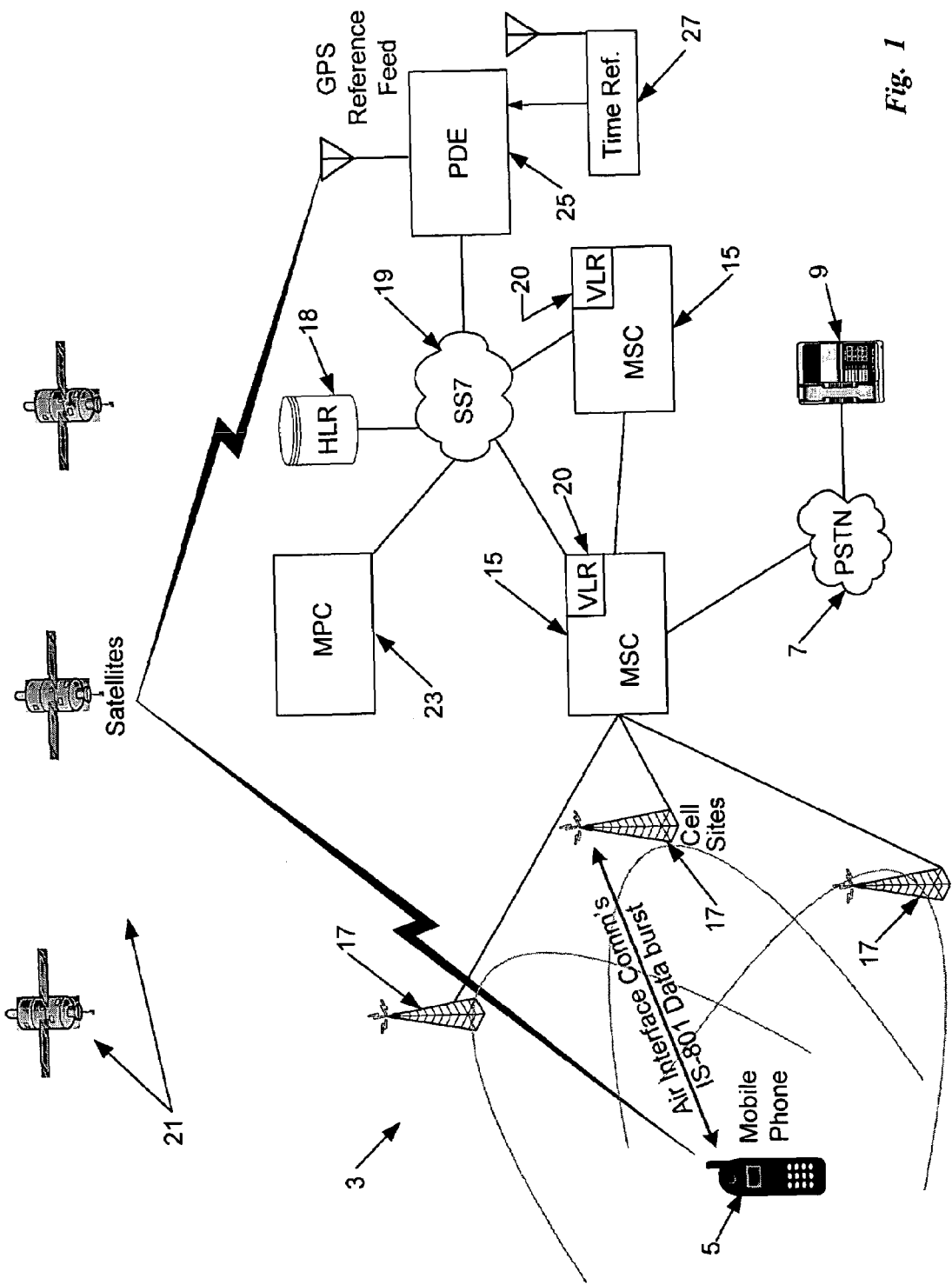
FIG. 1 is a high-level, functional block diagram, of a wireless communication network, which also offers a terminal-location service in accord with concepts disclosed herein.

In the network of FIG. 1, a wireless service communication network provides voice telephone communications to subscribers, and the network may offer data services. As shown, the system includes a wireless communication network 3 that provide wireless telephone or personal communications service (PCS) type communication to and from mobile stations, represented by way of example by mobile handset 5. Each such network 3 enables users of the mobile stations 5 to initiate and receive telephone calls to each other as well as through the public switched telephone network (PSTN) 7 to and from telephone devices 9. Today, a network 3 also typically enables users of appropriately equipped mobile stations 5 to initiate and receive various data communications, for example via the public data network referred to as the Internet (not shown).

The mobile stations 5 may take many forms. For example, some mobile stations may be mobile telephone stations, at least some with enhanced display and user input capabilities to support browsing and other data communications applications in addition to voice telephone service. Other mobile stations may comprise portable digital assistants (PDAs) with built-in wireless communication capabilities. As another alternative, a wireless device such as a mobile transceiver having data communication capabilities may be connected to a portable computing device such as a handheld or laptop type computer.

Each network 3 provides these wireless communication services for mobile stations 5 in accord with a digital protocol or an analog protocol or both. Each regional network 3 includes one or more mobile switching centers (MSCs) 15. Each MSC 15 connects through trunk circuits to a number of base stations 17, which the respective MSC controls.

The base station or base transceiver system (BTS) at a station 17, is the part of the radio network 3 that sends and receives RF signals to/from the mobile stations 5 that the base station 17 currently serves. The base station 17 connects to and communicates through the antenna systems on a radio tower. The base station transceiver system at site 17 contains the transmitters and receivers and is responsible for the control, monitoring, and supervision of calls made to and from each mobile station 5 within its serving area or "cell," over the wireless air link. The base station 17 assigns and reassigns channels to the mobile stations 5 in its area and monitors the signal levels to recommend hand-offs to other base stations 17.

Each network 3 typically includes a base station controller (BSC) functionality that controls the functions of a number of the base stations 17 and helps to manage how calls made by each mobile station 5 are transferred (or "handed-off") from one serving base station 17 to another. Each wireless network equipment vender implements this function differently. Some vendors have a physical entity, which they call a BSC, while other vendors include this functionality as part of their mobile switching center (MSC). For convenience of illustration, it is assumed that the BSC functionality in the network 3 is incorporated into the MSC 15.

Each mobile station 5 includes a transceiver compatible with one or more types of wireless network 3. The mobile stations 5, the MSCs 15 and the base stations 17 implement one or more standard air-link interfaces. For example, the wireless telephone network may support dual-mode services. Although not shown separately, such a dual-mode network includes wireless telephone components that send and receive analog telephone signals for communication over the air according to an analog wireless protocol (e.g. AMPS) as well as digital wireless system components that operate in accord with a digital wireless protocol, for example the CDMA protocol IS-9S. The base stations may provide both types of services. Alternatively, the network may comprise base stations that send and receive voice and signaling traffic according to the prescribed analog protocol as well as digital base stations that utilize the digital wireless protocol. Each dual-mode MSC typically includes a switching subsystem for analog telephone services, a switching subsystem for digital telephone services, and a control subsystem. Other MSCs 15 may implement only one type of service.

The mobile stations 5 often include at least corresponding dual mode capability, for example, including an AMPS analog transceiver and a digital transceiver. Digital wireless equipment is available today to support any of several common interface standards, including time division multiple access (TDMA) and the Global System for Mobile communications (GSM). In the example, the digital wireless telephone components support the code division multiple access (CDMA) standards. Increasingly, advanced cellular telephone implementations of the stations 5 are capable of a third mode, to allow operation in networks utilizing an alternative digital protocol or frequency band for digital voice and/or data services.

In the example, through the MSC 15 and the base stations 17, a network 3 provides voice-grade telephone services over the common air interface to and from the portable handset type mobile stations 5. The network 3 may also provide data communications services to at least some mobile stations. Although not shown for simplicity, for the data services, each regional network 3 includes an interworking function (IWF) node or a Packet Data Serving Node (PDSN) coupled to the MSC 15 to support data services. The IWF node or PDSN provides packet data routing to enable packet data communications over the logical communication channels of the wireless air interface, for example for the communications via the Internet.

The exemplary wireless communication system includes a signaling network, separate from the links carrying the actual traffic communications. Although the separation between traffic and signaling may be logical, in many implementations, the signaling network uses physically separate circuits and separate switches or routers. In modern telephone and cellular telephone networks, the signaling network is a packet network, such as a signaling system 7 (SS7) network 19. The SS7 network 19 carries signaling message packets between offices (such as MSCs 15) and other network nodes, for call set-up and other service control purposes.

For wireless services, the mobile stations 5 are provisioned to normally operate in the serving area of one wireless system operated by the user's access service provider, and this radio system is referred to as the "home" location or system. Within wireless network 3 providing the "home" service for mobile station 5 is a Home Location Register (HLR) 18, which stores data regarding the valid station's identification, the assigned telephone number, subscription service options, terminal capabilities, etc. The home network 3 uses the service information from the HLR 18 to provide the subscribed services to each user's mobile station 5, while the station is operating in the service area of the home network.

Although the HLR 18 may reside in an MSC or other switch, today, the HLR typically runs as an application/database on a separate computer coupled for packet signaling communication via the SS7 network 19. In some networks, the computer or server providing the HLR functionality is referred to as a Service Control Point (SCP). Of course, there may be multiple computers distributed throughout the network for performing the HLR function. In some implementations, the SCP functionality is incorporated into an MSC or into a switch or router of the packet network providing the SS7 signaling communications.

As a customer roams, the mobile station 5 registers in services areas other than the home area. To facilitate roaming and attendant registration, each network 3 also implements a Visitor Location Register (VLR) 20, typically in the MSCs 15, although the function may be implemented in other network nodes. The VLR 20 and the HLR 18 interact to validate the roaming mobile station 5. For a validated station 5, service information for that station is downloaded from the HLR 18 to the VLR 20 in a visited access network during a successful registration process.

Typically, the registration-related communications between VLR and HLR are accomplished by packet message exchange via the SS7 type interoffice signaling network 19. The SS7 network also carries call set-up related messages between offices, for example, between an MSC in a home region and an MSC in a visited region during processing of an incoming call directed to a roaming mobile station 5. Of note for purposes of the discussion of location-related services, the station location operations also involve signaling communications through the network 19 to and from the MSC 15 serving the station 5 at its current location.

There are a number of different techniques for obtaining data that may be processed to determine the location of a mobile station 5. The cell sites and/or MSC may provide cell and sector data for one or more base stations detecting signals from the mobile station 5 in question. Some networks 3 include equipment to triangulate on a signal from a mobile station 5. By way of example, assume now that the location functions in the illustrated system rely on positioning data obtained from the mobile station 5.

In general, a digital telephone type implementation of the mobile station 5 includes a microphone and speaker coupled to a voice coder/decoder (sometimes referred to as a CODEC), a transceiver, a central processor and elements for providing a user interface. For example, the mobile telephone may include a display for displaying a menu generated by a client browser, a keypad for entry of dialing digits and generating selection inputs keyed by the user based on the displayed menu, cursor control keys, and the like. For purposes of the location functions, in this example, the mobile station 5 itself includes a GPS receiver. The various elements of the station interact under the control of an internal processor configured for controlling the various telecommunication operations, including executing stored software routines, for activation of the digital telephone, call processing, telephonic speech communication and navigation of the packet switched network (if provided). The digital telephone also includes a read-only memory (ROM) for storing basic CPU routines, a flash memory, and a non-volatile random access memory for storing executable programs associated with the digital telephone services and digital telephone navigation.

As noted above, in this example, the mobile station 5 includes a GPS receiver for use in determining the station's location. GPS or the "Global Positioning System" is a satellite-base navigation system. A constellation of orbiting satellites 21 broadcasts specially coded signals that can be processed in a GPS compatible receiver, enabling the receiver or other processing device to compute position, velocity and time information.

A network element identified as a Mobile Positioning Center (MPC) 23 serves as the point of interface of the wireless network 3 that manages geographic position information regarding mobile stations. The MPC 23 communicates location data to external data networks through an interworking function and a data network link (not shown), for example, to supply the location information to terminals in a public safety answering point (PSAP) or to another entity that needs or requests the location of the mobile station. For other services, the MPC 23 may provide the location information, and/or related information about the geographic area, to the mobile station itself, e.g. in response to a specific user request.

The network 3 also includes one or more Position Determining Entities (PDEs) 19. The PDE 19 manages the position or geographic location determination of the mobile terminal, by communicating with the mobile station 5 or another node in the network that can determine or has determined the location of the mobile station. The PDE 19, for example, may obtain cell and sector data from an MSC or from the HLR, VLR or other network elements. As another example, the PDE may obtain triangulation data from other location equipment. In the illustrated example, however, the PDE 19 queries the mobile station 5 for GPS signal measurement data, which it processes to determine latitude and longitude of the station's current location. The PDE 19 in turn forwards the latitude and longitude of the station's current location, through the SS7 signaling network 19, for further use and/or delivery by the MPC 23.

The exchange of messages between the PDE 19 and the mobile station 5, in this example, uses Short Message Delivery Point-to-Point (SMDPP) protocol messages. In practice, the PDE communicates such messages with the MSC 15 serving the mobile station in question, and the MSC in turn communicates via a cell site 17 and the air interface with the mobile station. The air interface communications utilize IS-801 data bursts. Although other forms of signaling could be used between the PDE 25 and the MSC 15, in the example, the PDE 25 communicates with the MSC 15 via the SS7 signaling network 19.

The PDE system 25 is essentially a general purpose programmable device with an interface for data communication via the signaling network 19. The device is programmed to use the signaling to communicate with the MSC 15 as well as through the MSC 15, the base stations 17 and the air-link to/from mobile stations 5. Because of size/space/cost constraints on the design of the mobile stations 5, the GPS receiver in the mobile station 5 has only reception capability, not the full GPS processing capability to resolve position from signals received from the satellites 21. Hence, when queried, the receiver in the mobile station 5 takes measurements on received GPS signals and sends measurement data to the PDE 25. The PDE 25 performs the data processing necessary to determine the latitude and longitude of the station 5 and transmits that data through the SS7 signaling network 19 to the MPC 23.

To facilitate its processing, the PDE 25 includes a GPS antenna and receiver (not separately shown or a pre-processed data feed, for receiving GPS signals from the satellites 21 of the orbiting constellation. The PDE processes directly received GPS signals to determine a satellite reference information for delivery to the mobile station. The PDE 25 may also be responsive to a separate time reference receiver 27, which determines timing, typically from the GPS satellite signals.

As shown by the above discussion, the signaling communication coming from and going back to the PDE 25, in support of a location determination, utilizes packet switched communications through the SS7 signaling network 19. This is the same packet network that carries registration signaling and call set-up signaling. Loading on the signaling network varies widely, e.g. as the degree of roaming and number of calls vary. For a variety of reasons, messages sent through such a packet switched network may not arrive at the destination in the order they were sent. In the case of the signaling for the location determination, a technique has been developed to prevent disruption of the process due to signaling message failures detected at the MSC, such as arrival of messages in an improper order.

The method of recovery presented here treats all failures the same, regardless of actual cause. The most common failure of interest here, however, results from arrival of certain messages at the MSC 15 in the wrong sequence or out of order. The ANSI-41 SS7 messages in use are defined in the standard SCCP Class 0, which means that delivery order can not be guaranteed. However, a node receiving messages out of order, particularly an MSC, will return a failure indication. In the course of an AGPS call flow, it is possible to have one or more possible failure points based on the message order or other network issues.

However, rather than abort a location attempt, the PDE or the like will initiate a retry in response to at least one type of failure indication. More specifically, in the examples using the above discussed signaling technologies, whenever the PDE 25 receives an SMS Cause Code 33 in a signaling message from the MSC 15, it will resend its last previous Invoke message without delay or alteration. This will give MSC 15 another chance to deliver the message to the mobile station 5 and ideally continue the message flow until the mobile station 5 has been successfully located. The PDE 25 may retry a particular Invoke message one or a finite number of times. The receipt of other SMSCauseCode values may still cause the message exchange to abort. As such, the PDE initiates the retry in response to a message containing a predetermined failure indication (SMS Cause Code 33 relating to "Destination Busy") from among the various failure indications (Cause Codes) that may be provided during processing through the network. The failure and retry may occur at any point in the process flow.

The retry technique involved here is applicable to signaling failures that may arise for a variety of reasons. However, since order of arrival is the most common failure, handling thereof with the new retry mechanism will be discussed here to provide a detailed example. Assume now that the MPC 23 has instructed the PDE 25 to determine the location of an identified mobile station 5, from among those operating in network 3.

In step S1, the PDE 25 initiates the AGPS call flow by sending an SMDPP Invoke message to the MSC 15 serving the mobile station 5 in question. The PDE 25 sends this first message to the MSC 14 via SS7 signaling network 19, for subsequent delivery by the MSC 15 to the mobile station 5 via the air interface (delivery step not separately shown).

The BearerData of the Invoke message will contain an IS-801 Position Determination Data Message (PDDM) for the mobile station 5. An example of what the first message might be is a "Request Mobile Station Info" type PDDM message.

The MSC 15 normally acknowledges receipt of the message. A failure could occur at this point, and if the return message indicated the particular type of failure, it could trigger retry at this point in the signaling flow. For purposes of this example, however, assume now that the MSC 15 acknowledges receipt of the first Invoke message by sending back an Ack in an SMDPP return result type message, through the SS7 signaling network 19 (step S2). Assume that the mobile station 5 replies to the PDE's message via the air interface. In response (at step S3), the MSC 15 packages the PDDM message with the GPS data from the mobile station 5 in an SMDPP Invoke type SS7 message and transmits that SMDPP message to the PDE 25, via the SS7 signaling network 19. An example of the reply message might be a "Provide Mobile Station Info" containing the GPS measurement data from the mobile station 5. At this point the PDE 25 must now acknowledge receipt of the latest Invoke message and initiate its next request to the mobile station to obtain additional GPS measurement data needed to compute the actual location of the mobile station.

At step S4, the PDE 25 formulates an acknowledgement message, in a downstream SMDPP return result message intended for the MSC 15. The PDE launches the SMDPP return result message into the SS7 signaling network. Then, at step S5, the PDE 25 sends a second SMDPP Invoke message, for example, a "Request Pilot Phase Measurement" message to request more GPS data. To distinguish these two messages in the drawing, the SMDPP return result type acknowledgement message is shown in dashed-line form, whereas the subsequent SMDPP Invoke #2 message is shown as a solid line.

At the MSC (shown by step S6), due to network latency, divergent paths, or other issues, the PDE's Ack and Invoke messages arrive in reverse order. As illustrated, the subsequently transmitted SMDPP Invoke #2 message (solid line) actually arrives before the SMDPP return result type acknowledgement message (dashed-line). Consequently, at step S7, the MSC 15 rejects the PDE's second invoke, and transmits back an SMSCauseCode of 33 (Destination Busy) in an upstream SMDPP return result type SS7 message. Rather than causing the PDE 25 to abort the location attempt, however, this now triggers the PDE retry mechanism.

Hence, at step S8, the PDE 25 again sends the second Invoke message, exactly the same as the first time (i.e. the same as at step S5). Typically, the new transmission of the Invoke message now arrives at the MSC 15 after the SMDPP return result acknowledgement (Ack) message, as expected by the MSC 15. At step S9, the MSC 15 therefore accepts the PDE's message, and the call flow continues on. The MSC 15 returns an acknowledgement (shown at S9) and processing continues, for example, with a subsequent transmission to the PDE of the requested data when returned from the mobile station 5 (similar to that at steps S2 and S3). If by chance the retry Invoke message (at S8) still arrives before the Ack message, the MSC would again rejects the PDE's second invoke message, and again the MSC transmits back an SMSCauseCode of 33. If so, the PDE may return to step S8 yet again to retry its transmission of the Invoke #2 message.

In practice, the PDE and MSC will exchange a series of Invoke and Ack messages similar to those in steps S1–S6, to allow the PDE to request and obtain GPS data two, three or more times, until the PDE has acquired all data necessary for the PDE to compute latitude and longitude data for the current position of the mobile station 5. The need for a retry (S8) may arise at any point in the procedure in which the MSC returns a result message with Cause Code 33, e.g. at any point where the MSC receives a new Invoke message before an expected Ack from the PDE. After successfully obtaining all necessary GPS measurement data, the PDE 25 computes the latitude and longitude of the mobile station 5 and forwards that location data to the MPC 23.

As shown by the above discussion, many of the functions relating to the enhanced location signaling procedures are implemented on a computer or router or the like, which performs the functions of the PDE 25. The hardware of computer platforms typically is general purpose in nature, albeit with an appropriate network connection for communication via the intranet, the Internet and/or other data networks, in this case for signaling communication via the particular type of network used to implement the signaling network 19. Although the network 19 could be an Ethernet network or other type of network carrying Internet Protocol (IP) packets, the network 19 typically is an SS7 network as discussed above. Hence, the PDE includes one or more interface cards for packet communication over one or more links of an SS7 network.

As known in the data processing and communications arts, a general-purpose computer typically comprises a central processor, an internal communication bus, various types of memory (RAM, ROM, EPROM, EEPROM, flash memory, cache memory, etc.), disk drives or other code and data storage systems, and one or more network interface cards or ports for communication purposes. The computer system also may be coupled to a display and one or more user input devices (not shown) such as alphanumeric and other keys of a keyboard, a mouse, a trackball, etc. The display and user input element(s) together form a service-related user interface, for interactive control of the operation of the computer system. These user interface elements may be locally coupled to the computer system, for example in a workstation configuration, or the user interface elements may be remote from the computer and communicate therewith via a network. The elements of such a general-purpose computer system also may be combined with or built into routing elements or nodes of the network, such as an IWF node, a router of the signaling network 19, a server or other computer providing the HLR function, or one of the MSCs 15.

Figure 2:
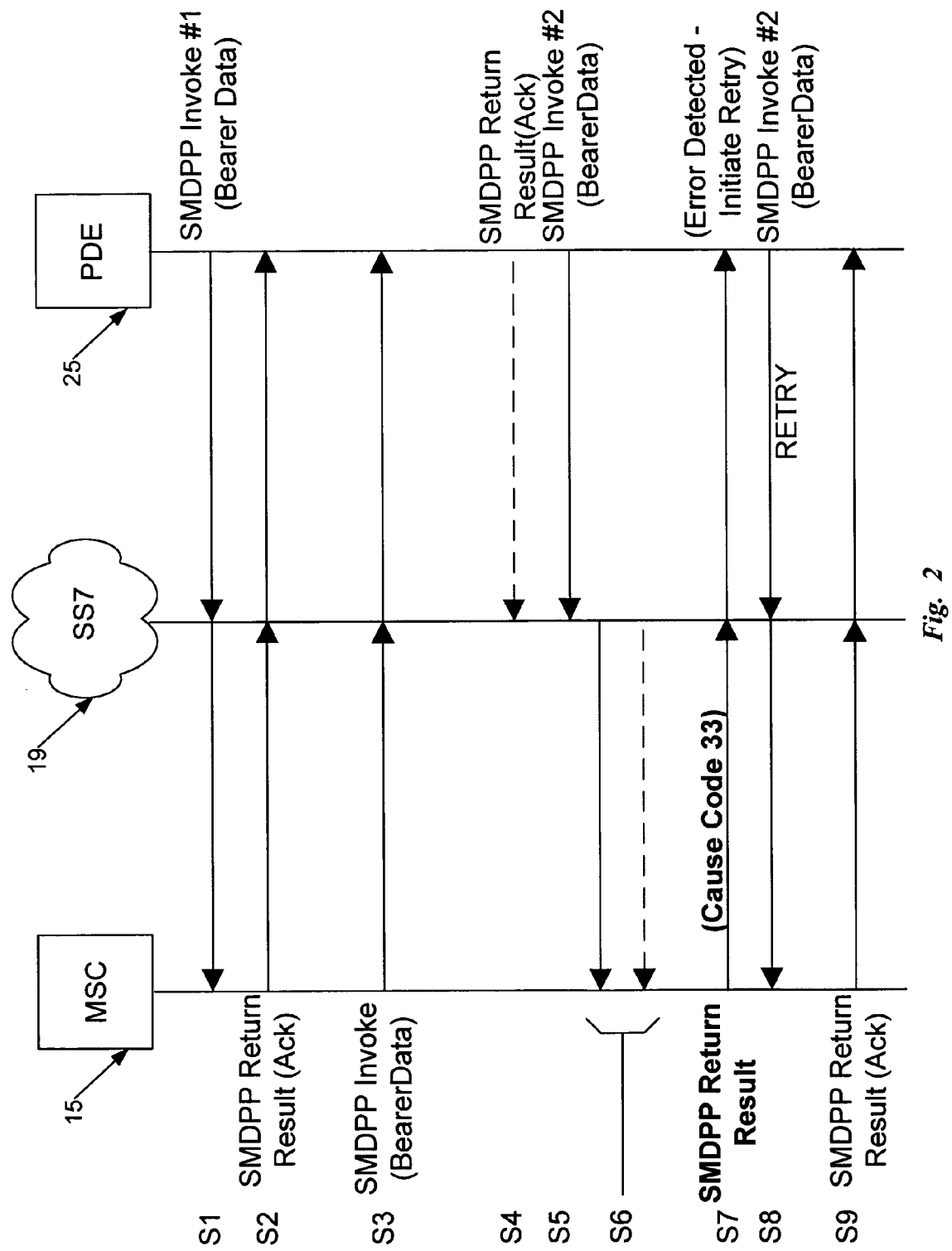
FIG. 2 is a signal flow diagram, illustrating the exchanges of messages between certain nodes of the network of FIG. 1 during a process to obtain location information regarding a mobile station.
Figure 3:
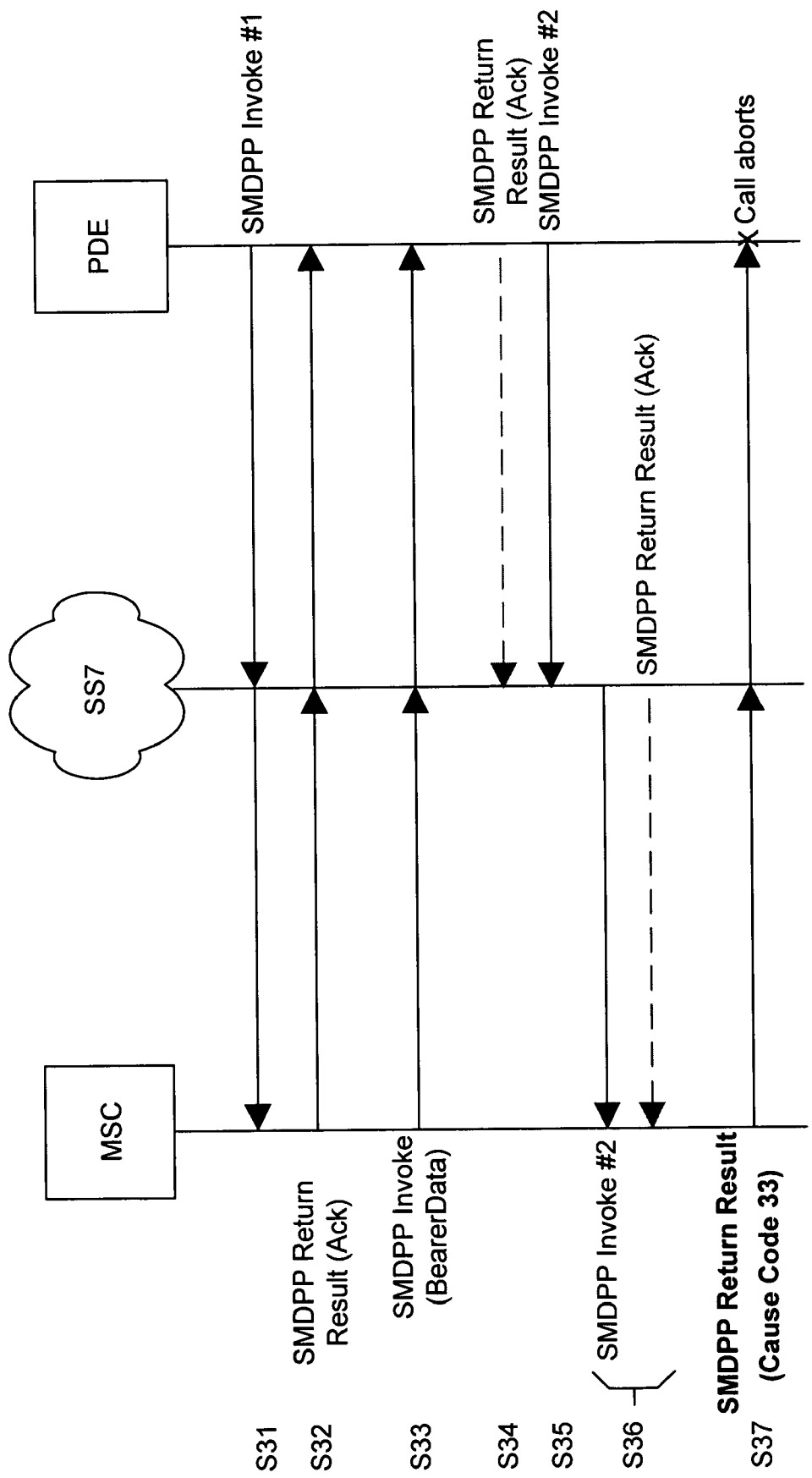
FIG. 3 is a signal flow diagram, illustrating the exchanges of messages between nodes of a wireless network, during a prior art attempt to obtain location information regarding a mobile station.

The software functionalities, e.g. to implement the signaling communications shown in FIG. 2 and the attendant GPS data processing to determine location, involve programming, including executable code as well as associated stored data. The software code is executable by the general-purpose computer or other system component(s) that functions as the PDE 19. In operation, the executable program code and possibly the associated data are stored within the general-purpose computer platform. At other times, however, the software may be stored at other locations and/or transported for loading into the appropriate general-purpose computer system. Hence, program embodiments involve one or more software products in the form of one or more modules of code carried by at least one machine-readable. Execution of such code by a processor of the computer or other platform enables the platform to perform the PDE functions, in essentially the manner performed in the embodiments discussed and illustrated herein.

As used herein, terms such as computer or machine "readable medium" refer to any medium that participates in providing instructions or data to a processor for execution. Such a medium may take many forms, including but not limited to, non-volatile media, volatile media, and transmission media. Non-volatile media include, for example, optical or magnetic disks, such as any of the storage devices in any computer(s) operating as or in one of the elements of the system of FIG. 1. Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Many of these forms of computer readable media may be involved in carrying one or more sequences of one or more instructions to a processor for storage and/or for execution.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of exchanging messages through a signaling network between a position determining entity (PDE) and a mobile switching center (MSC) of a wireless communication system serving a plurality of mobile stations, to obtain information relating to a geographic location of an identified mobile station operating in the wireless communication system, the method comprising:

receiving a message at the PDE from the MSC via the signaling network, related to an operation for determining the geographic location of the identified mobile station;

sending an acknowledgement of the received message, intended for the MSC, through the signaling network from the PDE;

after sending the acknowledgement of the received message, sending a request message requesting information related to the geographic location of the identified mobile station, intended for the MSC, through the signaling network from the PDE;

receiving a message at the PDE from the MSC via the signaling network indicating a predetermined one of a plurality of possible failure conditions;

in response to the receipt of the message indicating the predetermined failure condition, resending the request message, intended for the MSC, through the signaling network from the PDE; and receiving a response message at the PDE from the MSC via the signaling network, the response message containing the requested information related to the geographic location of the identified mobile station.

2. The method of claim 1 in combination with a further step, comprising processing the related information from the received response message to identify the geographic location of the selected mobile station.

3. The method of claim 1, wherein the predetermined failure results from receipt at the MSC of the acknowledgement prior to receipt at the MSC of the information request message.

4. The method of claim 1, wherein the predetermined failure condition is identified as a "Destination Busy" condition.

5. The method of claim 1, wherein:
the exchanged messages are formatted as Short Message Delivery Point-to-Point (SMDPP) protocol messages; and
the message indicating the predetermined failure condition is an SMDPP return result message containing a predetermined Cause Code corresponding to the predetermined failure condition.

6. The method of claim 5, wherein the predetermined Cause Code comprises a cause code corresponding to a "Destination Busy" condition.

7. The method of claim 1, wherein the information related to the geographic location of a selected mobile station comprises global positioning satellite (GPS) data from the mobile station.

8. The method of claim 1, wherein the MSC comprises a mobile switching center of the wireless communication system.

9. A product comprising a machine readable medium and programming embodying the method of claim 1 carried on the medium.

10. A method of determining location of a selected one of a plurality of mobile stations operating in a wireless communication network, the method comprising:
sending a first request signaling message from a position determining entity (PDE) to a mobile switching center of the wireless communication network, to request first information regarding the location of the one mobile station;
receiving the first requested information at the PDE from the mobile switching center;
sending an acknowledgement signaling message from the PDE to the mobile switching center acknowledging receipt of the first requested information;
sending a second request signaling message from the PDE to the mobile switching center, to request second information regarding the location of the one mobile station;
after sending the second request signaling message, receiving a signaling message at the PDE from the mobile switching center indicating a failure;
in response to receipt of the signaling message indicating failure, resending the second request signaling message from the PDE to the mobile switching center, to repeat the request for the second information regarding the location of the one mobile station;
receiving the second requested information at the PDE from the mobile switching center; and
processing the received first and second requested information to determine the location of the one mobile station.

11. The method of claim 10, wherein:
the first and second requested information comprise first and second global positioning satellite (GPS) data from the one mobile station; and
the step of processing comprises processing the first and second GPS data to determine latitude and longitude of the geographic location of the one mobile station.

12. The method of claim 10, wherein each of the sending and receiving steps involve transmission and reception of one or more packets to or from the mobile switching center via a packet switched network portion of the wireless communication network.

13. The method of claim 12, wherein the failure results from receipt at the mobile switching center of the second request signaling message prior to receipt of the acknowledgement signaling message.

14. The method of claim 12, wherein the packet switched network portion of the wireless communication network comprises a Signaling System 7 (SS7) type interoffice signaling network.

15. The method of claim 14, wherein the signaling message indicating failure contains a Cause Code signifying "Destination Busy."

16. A programmable system for operation as a position determining entity (PDE) in a wireless communication network, for determining location of a mobile station operating in the wireless communication network, wherein the programmable system reading from a computer readable media is programmed to perform the steps comprising:
sending a first request signaling message from the PDE to a mobile switching center of the wireless communication network, to request first information regarding the mobile station location;
receiving the first requested information at the PDE from the mobile switching center;
sending an acknowledgement signaling message from the PDE to the mobile switching center acknowledging receipt of the first requested information;
sending a second request signaling message from the PDE to the mobile switching center, to request second information regarding the mobile station location;
after sending the second request signaling message, receiving a signaling message at the PDE from the mobile switching center indicating a failure;
in response to receipt of the signaling message indicating failure, resending the second request signaling message from the PDE to the mobile switching center, to repeat the request for the second information regarding the mobile station location;
receiving the second requested information at the PDE from the mobile switching center; and
processing the received first and second requested information to determine the location of the mobile station;
wherein the computer readable media is comprising one of non-volatile media and volatile media.

17. A product comprising programming embodied in or carried on a machine readable medium, wherein execution of the programming by a system coupled to a wireless communication network will cause the system reading from a computer readable media to function as a position determining entity (PDE) to determine location of a mobile station operating in the wireless communication network by performing the steps comprising:
sending a first request signaling message from the PDE to a mobile switching center of the wireless communication network, to request first information regarding the mobile station location;
receiving the first requested information at the PDE from the mobile switching center;
sending an acknowledgement signaling message from the PDE to the mobile switching center acknowledging receipt of the first requested information;
sending a second request signaling message from the PDE to the mobile switching center, to request second information regarding the mobile station location;
after sending the second request signaling message, receiving a signaling message at the PDE from the mobile switching center indicating a failure;

in response to receipt of the signaling message indicating failure, resending the second request signaling message from the PDE to the mobile switching center, to repeat the request for the second information regarding the mobile station location;

receiving the second requested information at the PDE from the mobile switching center; and processing the received first and second requested information to determine the location of the mobile station;

wherein the computer readable media is comprising one of non-volatile media and volatile media.

18. A method of obtaining information relating to a geographic location of a selected mobile station operating in a wireless communication system, the method comprising:

exchanging messages through a signaling network between a position determining entity (PDE) and a mobile switching center (MSC) of the wireless communication system serving a plurality of mobile stations, to request and obtain the information relating to the geographic location of the selected mobile station, the exchanging of messages including at least one step of sending an information request message from the PDE, intended for the MSC, through the signaling network;

receiving a message from the MSC at the PDE via the signaling network indicating a predetermined one of a plurality of possible failure conditions, after the sending of the information request message;

in response to the receipt of the message indicating the predetermined failure condition, resending the information request message from the PDE, intended for the MSC, through the signaling network; and continuing the exchanging of messages until the information relating to the geographic location of the mobile station is successfully obtained, the continued exchanging of messages including a step of receiving a response message from the MSC at the PDE via the signaling network, the response message containing information related to the geographic location of the selected mobile station responsive to the information request message.

19. A product comprising programming embodied in or carried on a machine readable medium, wherein execution of the programming by a system coupled to the wireless communication network will cause the system to obtain information regarding the location of the mobile station by performing the method of claim 18.

* * * * *